Sept. 10, 1963 W. V. COPE 3,103,340
ROTATABLE SEALING VALVE MEANS WITH FRICTION
REDUCING MEANS FOR FAUCETS
Filed May 7, 1962
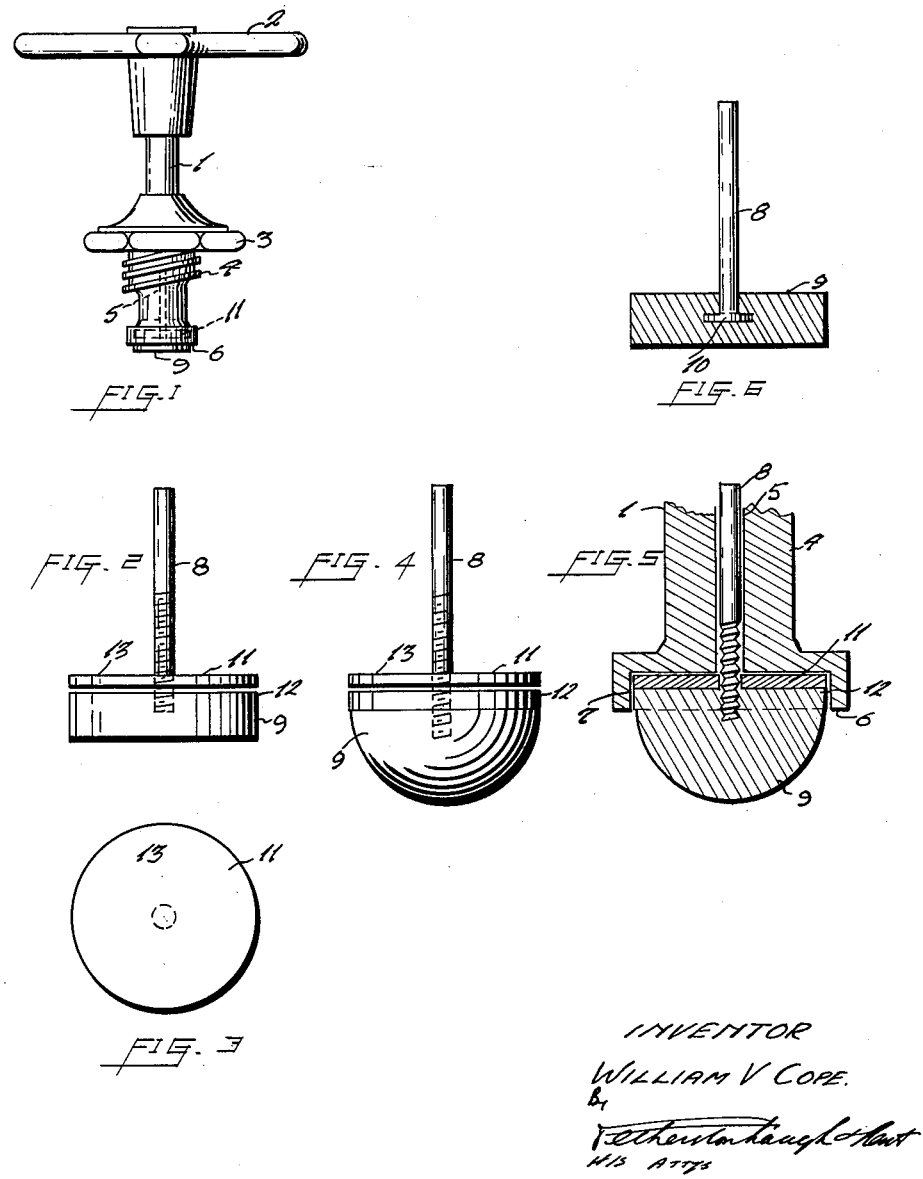
INVENTOR
WILLIAM V COPE.
By
Fetherstonhaugh & Hart
HIS ATTYS

United States Patent Office 3,103,340
Patented Sept. 10, 1963

3,103,340
ROTATABLE SEALING VALVE MEANS WITH FRICTION REDUCING MEANS FOR FAUCETS
William V. Cope, 1217 38th Ave. SW., Calgary, Alberta, Canada
Continuation of application Ser. No. 81,372, Jan. 9, 1961. This application May 7, 1962, Ser. No. 193,019
3 Claims. (Cl. 251—88)

My invention relates to new and useful improvements in faucets and this application constitutes a continuation of my copending application, Serial No. 81,372, filed January 9, 1961, and now abandoned. Conventional faucets include a rotatable operating spindle and sealing valve means operatively connected therewith and adapted to engage and disengage the valve seat of the faucet. Resilient sealing valves normally used are either cylindrical resilient washers, semi-cylindrical washers, or spherical balls.

However, all of these suffer from a considerable disadvantage inasmuch as when they are tightened downwardly upon the seat, the resilient surface engaging seal binds and seizes on the seat during the last portion of rotation. Also when the faucet is opened, the initial rotation of the faucet has to overcome the frictional engagement of the resilient means with the seating.

This is not only difficult for the operator but also considerable wear takes place around the area of engagement of the sealing means with the seating.

The aforementioned remarks also are applicable to the upper surface of the sealing means where it engages the lower end of the spindle of the faucet.

I have overcome this distinct disadvantage by providing a friction reducing washer between the upper surface of the resilient valve and the lower end of the faucet spindle without interfering in any way with the sealing properties of the valve. By providing this washer, as soon as the lower portion of the sealing valve engages the seating, further rotation of the spindle is permitted by the lower end thereof engaging the friction reducing washer so that the resilient sealing valve does not rotate but is merely engaged further upon the valve seating.

The principal object and essence of my invention is therefore to provide a device of the character herewithin described which reduces the rotational friction between the faucet spindle and the sealing valve thus not only making it easier for the operator but induces longer life to the sealing valve.

Another object of my invention is to provide a device of the character herewithin described which is readily adaptable with all conventional sealing valves normally used in faucets.

Yet another object of my invention is to provide a device of the character herewithin described which is simple in construction, economical in operation, and otherwise well suited for the purpose for which it is described.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of a faucet with my device in situ, but reduced in scale with reference to the remainder of the drawings.

FIGURE 2 is a side elevation of my device per se.

FIGURE 3 is a top plan view of FIGURE 2.

FIGURE 4 is an alternative embodiment of my device.

FIGURE 5 is an enlarged fragmentary sectional view showing the device of FIGURE 4 situated within the lower end of the faucet spindle.

FIGURE 6 is a sectional view of a resilient seating valve in which the valve is secured to the stem in an alternative manner.

In the drawings like characters of reference indicate corresponding parts in the different figures.

Proceeding, therefore to describe my invention in detail, reference should first be made to FIGURE 1 which shows a conventional faucet spindle 1 having operating means 2 secured to the upper end thereof and showing the usual closure flange 3 freely surrounding the spindle 1.

The lower end of the spindle 1 is enlarged and screw threaded as at 4 and reference to FIGURE 5 will show that this lower end 4 is apertured centrally as at 5 and recessed on the extreme lower end 6 as at 7. It will be appreciated that this spindle engages within the faucet proper and that by rotating the spindle 1, the lower end 6 is raised and lowered with respect to the conventional faucet valve seating (not illustrated).

My device consists of a stem 8 adapted to engage freely within the drilling or aperture 5 in the spindle 1 and having a resilient sealing valve 9 secured upon the lower end thereof.

This sealing valve 9, normally manufactured from rubber, or synthetic material, is either cylindrical in configuration as shown in FIGURE 2, or semi-spherical in configuration as shown in FIGURES 4 and 5.

The stem 6 is secured to the sealing valve 9 either by screw threading engagement as clearly shown in FIGURES 2, 4 or 5 or being moulded integrally therewith as shown in FIGURE 6.

In this connection it is desirable to provide an enlarged end 10 upon the spindle 8 to prevent inadvertent disengagement of the stem from the sealing valve 9.

Freely surrounding the stem 8 is a friction reducing washer 11 circular when viewed in plan, said washer being manufactured preferably from copper. However it will be appreciated that any metal can be used or, if desired, an impregnated relatively hard fibre can be utilized. In any event, the washer should be relatively rigid or hard to provide the desirable anti-friction properties thereto.

The diameter of the washer 11 should be substantially similar to the diameter of the upper side 12 of the sealing valve 9 so that both the upper sides 12 and the washer 11 fit freely within the recess 7 at the lower end of spindle 1 as clearly shown in FIGURE 5.

In operation, when the spindle of the faucet is screwed downwardly, the valve 9 engages the seating whereupon the lower end 6 of the spindle rotates upon the upper surface 13 of the washer 11 thereby preventing the spindle from turning the valve against the seating.

Conversely, when the faucet is released, the lower end 6 merely rotates upon the surface 13 without rotating the sealing valve upon the seat.

The valve and stem are prevented from disengagement from the faucet when in the open position by the action of the water pressure upon the underside of the washer. This permits the above mentioned free floating action to occur.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:
1. In a faucet including a screw threaded rotatable operating spindle being concentrically apertured at the lower end thereof; a free floating stem engageable within said apertured lower end of said spindle for movement therein, a resilient sealing valve secured to the lower end of said stem, friction reducing means loosely mounted around said stem and freely resting on the upper surface of said sealing valve, said friction reducing means taking the form of a substantially rigid planar washer, an enlarged cylindrical portion formed on the lower end of said spindle, said enlarged portion being concentrically recessed on the under surface thereof, the diameter of the upper portion of said sealing valve and the diameter of said friction reducing means being less than the diameter of said recess of said enlarged portion whereby said friction reducing means and said upper portion of said sealing valve engage freely within said recess guided by the engagement of said stem within said apertured end of said spindle.

2. The device according to claim 1 in which said sealing valve is semi-spherical with the planar surface thereof engaging said stem concentrically.

3. The device according to claim 1 in which said sealing valve is cylindrical with one planar surface thereof engaging said stem concentrically.

References Cited in the file of this patent

UNITED STATES PATENTS

| | | |
|---|---|---|
| 1,366,803 | Hofmann | Jan. 25, 1921 |
| 2,081,616 | Diamond | May 25, 1937 |
| 2,201,065 | Toolman | May 14, 1940 |
| 2,646,246 | Tucci | July 21, 1953 |

FOREIGN PATENTS

| | | |
|---|---|---|
| 149,141 | Austria | Apr. 10, 1937 |